United States Patent Office 2,879,202
Patented Mar. 24, 1959

2,879,202

STABILIZATION OF LIVE VIRAL VACCINES BY HEXAHYDRIC ALCOHOLS

Stewart Aiston, Congers, and Irvin S. Danielson, Pearl River, N.Y., assignors to American Cyanamid Company, New York, N.Y., a corporation of Maine No Drawing. Application November 5, 1954
Serial No. 467,213

11 Claims. (Cl. 167—78)

The present invention relates to vaccines and to methods of preparing the same. More particularly, the invention is concerned with improved vaccines containing live microorganisms selected from the group consisting of viruses and rickettsiae of increased stability and possessing effective potency over longer periods of time.

Vaccines are preparations normally consisting of a microorganism such as bacteria, rickettsia or virus which has been treated or manipulated to reduce or to attenuate its virulence and which is used for preventative inoculation to induce active immunity by the production within the animal body of antibodies against the specific microorganism used in the vaccine. Substantially all of these preparations lose their efficacy and potency quite rapidly, especially when exposed to room temperature for prolonged periods of time. Storage under refrigeration somewhat increases the life of these preparations but, even under the most desirable conditions, their properties are shortlived. Consequently, only small inventories of fresh supplies of such vaccines may be kept on hand in hospitals, research facilities and laboratories and must be replenished at all too frequent intervals. The problem is further complicated by the increasing number and variety of vaccines available for use particularly in the case of the smaller or more remote laboratories which cannot practically or conveniently store the many types required.

It is highly desirable, therefore, and a principal object of the present invention to provide vaccines containing live microorganisms selected from the group consisting of viruses and rickettsiae of greater stability and longer storage life whereby larger amounts of a greater variety of such supplies may be safely stored with a minimized loss of potency over longer periods of time.

It has been found that vaccines containing live microorganisms selected from the group consisting of viruses and rickettsiae can be preserved and maintained at effective potency for much longer periods of time when hexahydroxy alcohols are employed in the preparation of the vaccine.

Illustrative of such hexahydric alcohols are sorbitol, mannitol, inositol, dulcitol, and the like and it is to be appreciated that these alcohols may be used individually or in admixture with one another, as desired.

Among the vaccines which have been found to be satisfactorily applicable within the concepts of the present invention may be cited the vaccines for diseases such as small pox, yellow fever, distemper, hog cholera, fowl pox, Newcastle disease, pigeon pox, rabies, poliomyelitis, etc. It is to be observed that these vaccines contain live microorganisms and further are cited primarily as illustrative of the applications of the invention and are not to be construed as limitative thereof.

The amount of the hexahydric alcohol to be incorporated in the vaccines for stabilizing purposes will depend on many factors such as the nature of the vaccine itself, its properties and characteristics, the form wherein it is to be stored, and the like. For example, in dried vaccines, amounts as low as about 0.5% or as high as about 8-10% or higher, based on the dry weight of the hexahydroxy alcohol, have been found satisfactory with preferred commercial ranges lying between about 2% and about 7%. In the case of fluid vaccines, wherein drying characteristics and properties are of lesser importance, similar amounts may be used, although amounts of up to about 60% or more, based on the dry weight of the hexahydroxy alcohol, may be advantageously employed for increased stabilizing effects, particularly where aqueous solutions are involved, with preferred commercial ranges lying between about 10% and about 50%.

Any suitable standard procedure may be employed to prepare the vaccine. The microorganisms may be obtained from any suitable source, such as, for example, from a stock strain or directly from an animal or patient and propagated by well known methods in chick embryo tissue or extra embryonic membranes, calf lymph, tissue culture, or other suitable media. A finely divided emulsion may then be formed and mixed or blended with the selected hexahydric alcohol in the desired amount. If desired, the selected polyhydric may be mixed or blended initially with the virus prior to the formation of the finely divided emulsion. The alcohol may be employed either in the dried crystalline form or in a concentrated 70% commercial solution, such as "Arlex" or "Sorbo 70%."

The invention will be further described by reference to the following examples setting forth in specific details several preferred embodiments of the inventive concept as well as comparisons to vaccines presently used of lesser stability and of much shorter lives. It should be understood, however, that these examples and accompanying tables are given primarily for illustrative purposes and the inventive concept in its broader aspects is not to be construed as limited thereto. All percentages are by weight on a dry basis, unless otherwise stated.

EXAMPLE I

The following data will illustrate the stabilizing effect exerted by sorbitol when added to live virus vaccines (poliomyelitis, Lansing type) which had been vacuum dried and stored at room temperature. In this data, the percentage chick embryo (C.E.) is the percentage suspension of homogenized infected chick embryo. The titers are expressed in $LD_{50}$ as determined and by intracerebral injection of various dilutions into mice, calculated by the Reed-Munch technique.

Table I

| Composition | Titer After Drying | Time of Storage, Days | Titer Following Storage |
|---|---|---|---|
| 40% C.E. in distilled water | $10^{-2.2}$ | 14 | $10^{-1.1}$ |
| 20% C.E. in distilled water | $10^{-2.5}$ | 10 | 0 |
| Do | $10^{-3.0}$ | 10 | $10^{-2.0}$ |
| 20% C.E. in 2% sorbitol | $10^{-2.5}$ | 76 | $10^{-3.1}$ |
| Do | $10^{-3.5}$ | 23 | $10^{-3.5}$ |
| Do | $10^{-3.6}$ | 23 | $10^{-3.0}$ |

EXAMPLE II

Small pox vaccine (live) was used in this example and was produced from the membranes of smallpox-infected embryonated eggs. The infected membranes were harvested, homogenized and suspended in the fluids indicated. The potency of the preparations before and after incubation at 35° C. was judged by the "takes" developing in rabbits when serial dilutions of the vaccine were applied to scarified areas of skin of the rabbits. All preparations were dried from the frozen state. Homogenized infected chick embryo membranes suspended in: (A) distilled water were used in obtaining the data of Table IIA; (B) distilled water containing sucrose and phosphate salts in Table IIB; (C) 7% sorbitol containing 5% peptone in Table IIC; and (D) 7% sorbitol containing 2% fresh egg yolk in Table IID.

*Table IIA*

[Distilled water.]

| | Percent takes 1:1,000 | Percent takes 1:3,000 | Percent takes 1:10,000 | Percent takes 1:30,000 | Percent takes 1:100,000 |
|---|---|---|---|---|---|
| Before incubation (Sample 1) | 97 | 77 | 39 | 12 | 9 |
| After 16 days incubation (1) | 0 | 0 | 0 | 0 | 0 |
| Before incubation (Sample 2) | 98 | 76 | 30 | 18 | 6 |
| After 16 days incubation (2) | 5 | 11 | 0 | 0 | 0 |

*Table IIB*

[Distilled water.]

| | Percent takes 1:1,000 | Percent takes 1:3,000 | Percent takes 1:10,000 | Percent takes 1:30,000 | Percent takes 1:100,000 |
|---|---|---|---|---|---|
| Before incubation (Sample 3) | 97 | 77 | 39 | 12 | 9 |
| After 16 days incubation (3) | 37 | 8 | 0 | 0 | 0 |
| Before incubation (Sample 4) | 98 | 76 | 30 | 18 | 6 |
| After 16 days incubation (4) | 16 | 2 | 0 | 0 | 0 |

*Table IIC*

[7% sorbitol.]

| | Percent takes 1:1,000 | Percent takes 1:3,000 | Percent takes 1:10,000 | Percent takes 1:30,000 | Percent takes 1:100,000 |
|---|---|---|---|---|---|
| Before incubation (Sample 5) | 98 | 89 | 80 | 77 | 64 |
| After 30 days incubation (5) | 98 | 80 | 63 | 50 | 0 |
| Before incubation (Sample 6) | 98 | 94 | 75 | 57 | 9 |
| After 30 days incubation (6) | 90 | 90 | 55 | 16 | 12 |

*Table IID*

[7% sorbitol.]

| | Percent takes 1:1,000 | Percent takes 1:3,000 | Percent takes 1:10,000 | Percent takes 1:30,000 | Percent takes 1:100,000 |
|---|---|---|---|---|---|
| Before incubation (Sample 7) | 98 | 98 | 82 | 81 | 42 |
| After 30 days incubation (7) | 93 | 80 | 44 | 7 | 15 |

EXAMPLE III

The following preparations were made from homogenized chick embryos which had been infected with live rabies virus (Flury strain). A 33% suspension was prepared and sorbitol was added as indicated in Table III. All preparations were vacuum dried from the frozen state. The potency data was calculated as $LD_{50}$ values obtained by injecting mice with serial dilutions of each preparation, calculated by the Reed-Munch technique.

*Table III*

| Percent sorbitol added | $LD_{50}$ Values after— | |
|---|---|---|
| | 7 days at 37° C. | 14 days at 37° C. |
| 0 | $10^{-2.3}$ | ------ |
| 0 | $10^{-2.85}$ | $10^{-1.98}$ |
| 2 | $10^{-3.95}$ | $10^{-3.65}$ |
| 5 | $10^{3.8}$ | $10^{-3.74}$ |
| 7 | $10^{-2.8}$ | $10^{-3.80}$ |

EXAMPLE IV

The following data will illustrate the stabilizing effect exerted by various hexahydric alcohols on dried rabies vaccine. All samples were prepared to contain 70% chick embryo tissue with additive in the concentrations indicated in Table IV. These samples were incubated at 37° C. for 7 and 21 days to accelerate the stability test. Each sample was titrated in mice in serial 10 fold dilutions and the $LD_{50}$ values were calculated, using the Reed-Munch technique.

*Table IV*

| Agent | Concentration per ml. | Titer After 7 days | Titer After 21 days |
|---|---|---|---|
| | *Mgm.* | | |
| Distilled water | ------ | $10^{-3.03}$ | $10^{-2.80}$ |
| Mannitol | 20 | $10^{-4.46}$ | $10^{-2.0}$ |
| Sorbitol | 20 | $10^{-4.40}$ | $10^{-3.28}$ |
| Do | 20 | $10^{-4.47}$ | $10^{-3.38}$ |

Mixtures of sorbitol and mannitol, sorbitol and inositol, and mannitol and inositol were employed in similar samples and titers after 7 days and 21 days at 37° C. ranged from $10^{-3.9}$–$10^{-4.4}$ to $10^{-3.0}$–$10^{-3.2}$, respectively, as calculated by the Reed-Munch technique.

EXAMPLE V

The following data will illustrate the stabilizing effect exerted on fluid small pox vaccines containing various percentages of glycerine and sorbitol. The figures given in the respective columns of Tables VA and VB "take indices" for rabbits as obtained by the following tests:

Each experimental sample of vaccine and a known control virus preparation are diluted at 1:1000, 1:3000, 1:10,000, 1:30,000 and 1:100,000, usually in beef heart infusion broth. For each titration, five superficial scratches of about 5 cm. in length are made on the shaved flanks of a rabbit with a sharp needle. Each of the above dilutions is then rubber vigorously into one screatch with the help of the blunt end of a glass tube. Inoculated rabbits are kept in individual cages for 5 days at which time the length of the scratch and the extent of the lesion are measured in millimeters and the percentage of the lesion, or "take," calculated. The mean average of "takes" obtained with the five dilutions of the control virus is considered as a "take index" of 1.0. This then allows the calculation of the "take indices" of the experimental vaccines tested simultaneously with the control virus.

Below is an illustration for calculation of a "take index."

| Dilutions | Control Virus (Percent "take") | Experimental Vaccine (Percent "take") |
|---|---|---|
| 1:1000 | 95 | 95 |
| 1:3000 | 90 | 95 |
| 1:10,000 | 89 | 90 |
| 1:30,000 | 66 | 26 |
| 1:100,000 | 26 | 30 |
| Total | 366 | 336 |
| Mean Average | 73.2 | 67.2 |

"Take index" $\frac{67.2}{73.2}=0.92$.

*Table VA*

"TAKE INDICES" OF DIFFERENT BATCHES OF FLUID SMALLPOX VACCINE, CHICK EMBRYO ORIGIN

| Diluent | Unincubated Samples | | Capillary Tubes Incubated at 35°-37° C. | | | | | | | | |
|---|---|---|---|---|---|---|---|---|---|---|---|
| | Bulk | Capillary Tubes | 1 Day | 2 Days | 3 Days | 4 Days | 5 Days | 6 Days | 7 Days | 14 Days | 21 Days |
| 50% Glycerin | 1.11 | 0.99 | 0.83 | 0.13 | 0.07 | 0 | 0.02 | -------- | -------- | -------- | -------- |
| Do | 1.07 | 1.07 | 0.74 | 0.52 | -------- | -------- | 0.05 | -------- | -------- | -------- | -------- |
| Do | -------- | 0.72 | 0.54 | 0.29 | 0.07 | 0.12 | 0.09 | -------- | -------- | -------- | -------- |
| 10% Sorbitol<br>20% Glycerin | -------- | 0.64 | 0.51 | 0.49 | 0.34 | 0.26 | 0.13 | -------- | -------- | -------- | -------- |
| 10% Sorbitol<br>10% Peptone<br>30% Glycerin | 1.19 | 0.94 | -------- | -------- | -------- | 0.85 | 0.90 | 0.59 | 0.65 | -------- | -------- |
| 10% Sorbitol<br>37% Glycerin | 1.18 | 0.98 | -------- | -------- | -------- | -------- | 0.63 | 0.21 | 0.25 | 0.01 | 0 |
| 20% Sorbitol<br>21% Glycerin | 1.17 | 1.05 | -------- | -------- | -------- | -------- | 0.60 | 0.48 | 0.19 | 0.04 | 0 |
| 30% Sorbitol<br>7% Glycerin | 1.21 | 1.12 | -------- | -------- | -------- | -------- | 0.78 | 0.56 | 0.36 | 0.06 | 0 |
| 50% Sorbitol | 1.13 | 1.05 | -------- | -------- | -------- | 0.92 | 0.71 | 0.73 | 0.61 | -------- | 0.02 |

*Table VB*

"TAKE INDICES" OF DIFFERENT BATCHES OF FLUID SMALLPOX VACCINE, CALF LYMPH ORIGIN

| Diluent | Unincubated Samples | | Capillary Tubes Incubated at 35°-37° C. | | | | | | |
|---|---|---|---|---|---|---|---|---|---|
| | Bulk | Capillary Tubes | 1 Day | 2 Days | 3 Days | 5 Days | 7 Days | 14 Days | 21 Days |
| 50% Glycerin | 1.08 | 1.13 | 0.60 | 0.21 | 0.10 | 0.03 | -------- | -------- | -------- |
| Do | 1.31 | 1.29 | 0.72 | 0.32 | 0.14 | 0.07 | -------- | -------- | -------- |
| Do | 0.88 | 0.88 | 0.54 | 0.19 | 0.15 | 0.07 | -------- | -------- | -------- |
| Do | 1.29 | 1.24 | 0.71 | -------- | 0.20 | 0.11 | -------- | -------- | -------- |
| 50% Sorbitol | 1.08 | 0.74 | -------- | -------- | 0.62 | 0.64 | 0.40 | 0.17 | 0 |
| 35% Sorbitol | 1.01 | 0.94 | -------- | -------- | 0.64 | 0.72 | 0.45 | 0.21 | 0.01 |
| 50% Sorbitol | 1.20 | 1.29 | -------- | -------- | 0.92 | 0.87 | 0.83 | 0.37 | 0.02 |
| Do | 1.24 | 1.11 | -------- | -------- | 0.81 | 0.75 | 0.57 | 0.39 | 0.11 |

Although several specific examples of the inventive concept have been described, the same should not be construed as limited thereby nor to the specific substances mentioned therein but to include various other compounds of equivalent constitution as set forth in the claims appended hereto. It is understood that any suitable changes, modifications and variations may be made without departing from the spirit and scope of the invention.

What we claim is:

1. A biological product comprising live avirulent virus effective in eliciting the production of immunizing antibodies in animals and 0.5 percent to 60 percent by weight of an alcohol of the group consisting of sorbitol, mannitol, inositol, and dulcitol, said alcohol having a stabilizing effect on said live virus whereby the vaccine has an effective immunizing potency over an extended period of time.

2. A biological product comprising live avirulent virus effective in eliciting the production of immunizing antibodies against smallpox in animals and 0.5 percent to 60 percent by weight of an alcohol of the group consisting of sorbitol, mannitol, inositol, and dulcitol, said alcohol having a stabilizing effect on said live virus whereby the vaccine has an effective immunizing potency over an extended period of time.

3. A biological product comprising live attenuated poliomyelitis virus effective in eliciting the production of immunizing antibodies in animals and 0.5 percent to 60 percent by weight of an alcohol of the group consisting of sorbitol, mannitol, inositol, and dulcitol, said alcohol having a stabilizing effect on said live virus whereby the vaccine has an effective immunizing potency over an extended period of time.

4. A biological product comprising live attenuated rabies virus effective in eliciting the production of immunizing antibodies in animals and 0.5 percent to 60 percent by weight of an alcohol of the group consisting of soribitol, mannitol, inositol, and dulcitol, said alcohol having a stabilizing effect on said live virus whereby the vaccine has an effective immunizing potency over an extended period of time.

5. A biological product comprising live avirulent virus effective in eliciting the production of immunizing antibodies in animals and 0.5 percent to 60 percent by weight of sorbitol, said sorbitol having a stabilizing effect on said live virus whereby the vaccine has an effective immunizing potency over an extended period of time.

6. A biological product comprising live avirulent virus effective in eliciting the production of immunizing antibodies in animals and 0.5 percent to 60 percent by weight of mannitol, said mannitol having a stabilizing effect on said live virus whereby the vaccine has an effective immunizing potency over an extended period of time.

7. A biological product comprising live avirulent virus effective in eliciting the production of immunizing antibodies in animals and 0.5 percent to 60 percent by weight of inositol, said inositol having a stabilizing effect on said live virus whereby the vaccine has an effective immunizing potency over an extended period of time.

8. A method of stabilizing live avirulent virus products containing live avirulent virus particles effective in eliciting the production of immunizing antibodies in animals, which comprises adding to said products from 0.5 percent to 60 percent by weight of an alcohol of the group consisting of sorbitol, mannitol, inositol, and dulcitol, said alcohol having a stabilizing effect on said live virus whereby the vaccine has an effective immunizing potency over an extended period of time.

9. A method of stabilizing a live avirulent virus product which comprises adding to said product containing live avirulent virus particles effective in eliciting the production of immunizing antibodies against smallpox in animals from 0.5 percent to 60 percent by weight of an alcohol of the group consisting of sorbitol, mannitol, inositol, and dulcitol, said alcohol having a stabilizing effect on said live virus whereby the vaccine has an effective immunizing potency over an extended period of time.

10. A method of stabilizing a live attenuated poliomyelitis virus product containing live attenuated virus particles effective in eliciting the production of immunizing antibodies in animals, which comprises adding to said product from 0.5 percent to 60 percent by weight of an alcohol of the group consisting of sorbitol, mannitol, inositol, and dulcitol, said alcohol having a stabilizing effect on said live virus whereby the vaccine has an effective immunizing potency over an extended period of time.

11. A method of stabilizing a live attenuated rabies virus product containing live attenuated virus particles effective in eliciting the production of immunizing antibodies in animals, which comprises adding to said product from 0.5 percent to 60 percent by weight of an alcohol of the group consisting of sorbitol, mannitol, inositol, and dulcitol, said alcohol having a stabilizing effect on said live virus whereby the vaccine has an effective immunizing potency over an extended period of time.

References Cited in the file of this patent

FOREIGN PATENTS

| | | |
|---|---|---|
| 26,148/30 | Australia | Apr. 11, 1930 |
| 28,066 1912 | Great Britain | December 1913 |

OTHER REFERENCES

Franklin et al.: Proc. Soc. Exptl. Biol. and Med., vol. 79, 1952, pp. 715–718 (thru "Reagents and Media for Tissue Culture and Virus Propagation," pub. by Difco, pp. 14–16).

Nature, vol. 168, December 8, 1951, pp. 990 and 991.

Fry: Article in "Freezing and Drying," pub. by Inst. of Biol., London, June 1951, pp. 107–115.

"Atlas Sorbitol," by Atlas Powder Co., Wilmington, Del., pp. 17, 47.

Levine: "A Compilation of Culture Media for the Cultivation of Microorganisms," by Williams and Wilkins, pp. 40, 425, 875, 881 and 888.